United States Patent
Mouri et al.

(10) Patent No.: US 10,538,193 B2
(45) Date of Patent: Jan. 21, 2020

(54) ILLUMINATION DEVICE FOR VEHICLE

(71) Applicants: Fumihiko Mouri, Owariasahi (JP); Takuya Kitazono, Yokohama (JP); Norikatsu Myojin, Kawasaki (JP)

(72) Inventors: Fumihiko Mouri, Owariasahi (JP); Takuya Kitazono, Yokohama (JP); Norikatsu Myojin, Kawasaki (JP)

(73) Assignees: TOYOTA JIDOSHA KABUSHIKI KAISHA, Toyota-shi (JP); STANLEY ELECTRIC CO., LTD., Meguro-ku (JP)

( * ) Notice: Subject to any disclaimer, the term of this patent is extended or adjusted under 35 U.S.C. 154(b) by 0 days.

(21) Appl. No.: 16/115,800

(22) Filed: Aug. 29, 2018

(65) Prior Publication Data
US 2019/0070997 A1 Mar. 7, 2019

(30) Foreign Application Priority Data
Sep. 4, 2017 (JP) .................. 2017-169879

(51) Int. Cl.
*B60Q 1/04* (2006.01)
*F21S 41/143* (2018.01)
(Continued)

(52) U.S. Cl.
CPC .............. *B60Q 1/04* (2013.01); *F21S 41/143* (2018.01); *F21S 41/25* (2018.01); *F21S 41/295* (2018.01);
(Continued)

(58) Field of Classification Search
CPC .......... B60Q 1/04; B60Q 1/0035; B60Q 1/18; B60Q 1/143; B60Q 1/0041; B60Q 2300/40; B60Q 2300/30; B60Q 2300/45; F21S 41/25; F21S 41/295; F21S 41/47; F21S 41/60; F21S 41/663; F21S 41/43;
(Continued)

(56) References Cited

U.S. PATENT DOCUMENTS

| 5,412,543 A | 5/1995 | Kobayashi et al. |
| 2009/0067186 A1* | 3/2009 | Futami ................. F21S 41/143 362/516 |
| 2009/0231866 A1* | 9/2009 | Yamamura ............. B60Q 1/085 362/466 |
| 2013/0121012 A1* | 5/2013 | Sato ........................ B60Q 1/24 362/520 |

(Continued)

FOREIGN PATENT DOCUMENTS

| AT | 11 129 U1 | 5/2010 |
| DE | 10 2014 200 368 A1 | 7/2015 |

(Continued)

OTHER PUBLICATIONS

Extended European Search Report dated Jan. 24, 2019 in corresponding European Patent Application No. 18191513.3, 7 pages.

*Primary Examiner* — Kevin Quarterman
(74) *Attorney, Agent, or Firm* — Oblon, McClelland, Maier & Neustadt, L.L.P.

(57) ABSTRACT

An illumination device for a vehicle includes: plural light sources that are disposed so as to be lined-up in at least one line, and that illuminate light; a light-blocking member having an opening portion onto which light illuminated from the light sources is incident; and a projecting lens that emits, toward an object, light that has passed through the opening portion of the light-blocking member and has been incident on the projecting lens.

12 Claims, 19 Drawing Sheets

(51) Int. Cl.
*F21S 41/43* (2018.01)
*F21S 41/25* (2018.01)
*F21S 41/29* (2018.01)
*F21S 41/47* (2018.01)
*F21S 41/60* (2018.01)
*F21Y 115/10* (2016.01)

(52) U.S. Cl.
CPC .............. *F21S 41/43* (2018.01); *F21S 41/47* (2018.01); *F21S 41/60* (2018.01); *B60Q 2300/30* (2013.01); *B60Q 2300/40* (2013.01); *F21Y 2115/10* (2016.08)

(58) Field of Classification Search
CPC ...... F21S 41/255; F21S 41/285; F21S 41/143; F21Y 2115/10
See application file for complete search history.

(56) References Cited

U.S. PATENT DOCUMENTS

| | | | |
|---|---|---|---|
| 2013/0135885 A1* | 5/2013 | Anzai | B60Q 1/0011 362/511 |
| 2014/0307458 A1* | 10/2014 | Brendle | F21S 41/143 362/516 |
| 2017/0276312 A1* | 9/2017 | Tanaka | B60Q 1/04 |
| 2018/0038567 A1* | 2/2018 | Park | F21S 41/141 |
| 2018/0058652 A1* | 3/2018 | Taudt | F21S 41/25 |

FOREIGN PATENT DOCUMENTS

| | | |
|---|---|---|
| EP | 2 827 049 A2 | 1/2015 |
| JP | 06-012901 | 1/1994 |
| JP | 2011-108589 A | 6/2011 |
| JP | 2013-086663 | 5/2013 |
| JP | 2017-134908 A | 8/2017 |
| WO | WO 2014/164792 A1 | 10/2014 |
| WO | WO 2016/161471 A1 | 10/2016 |

* cited by examiner

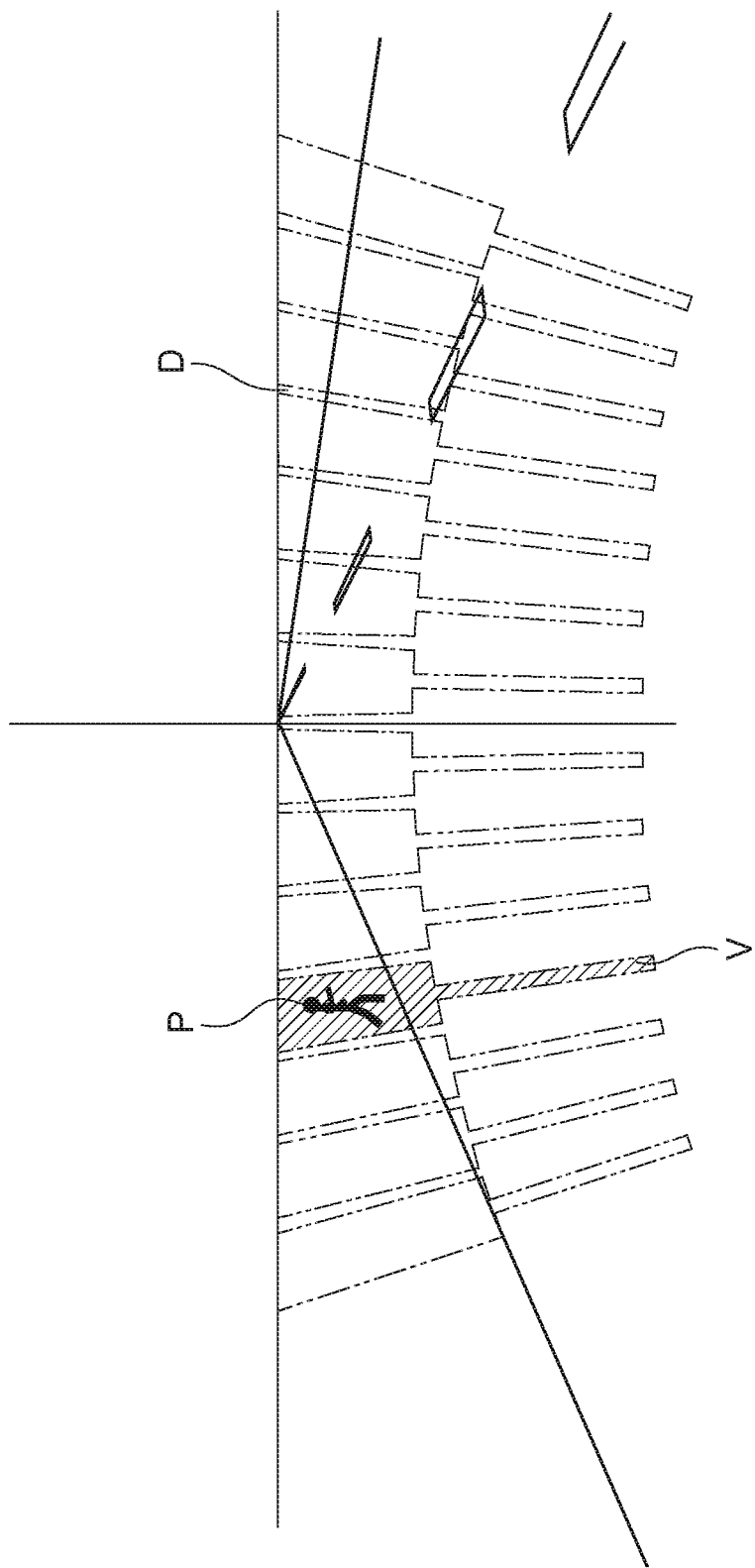

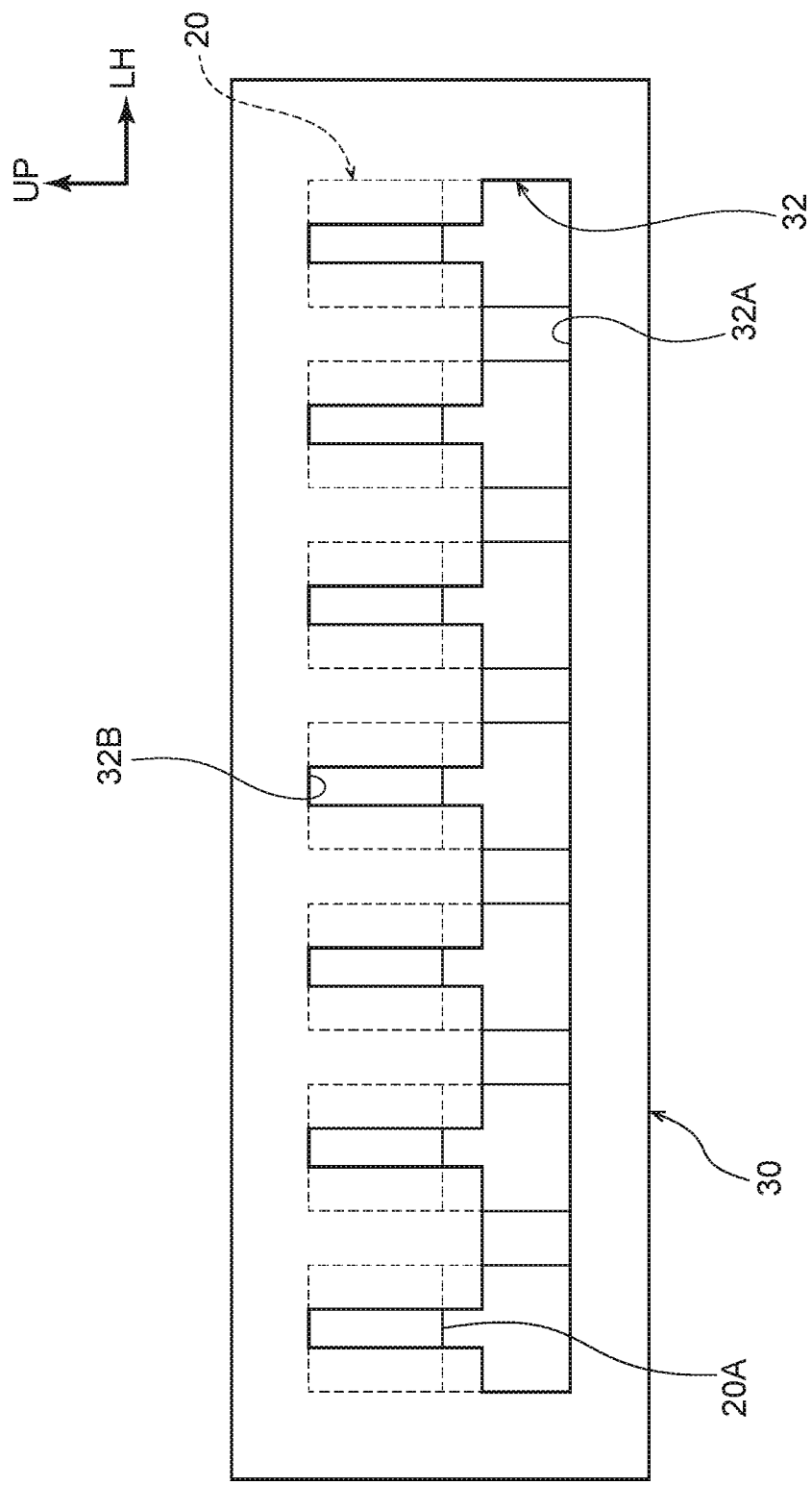

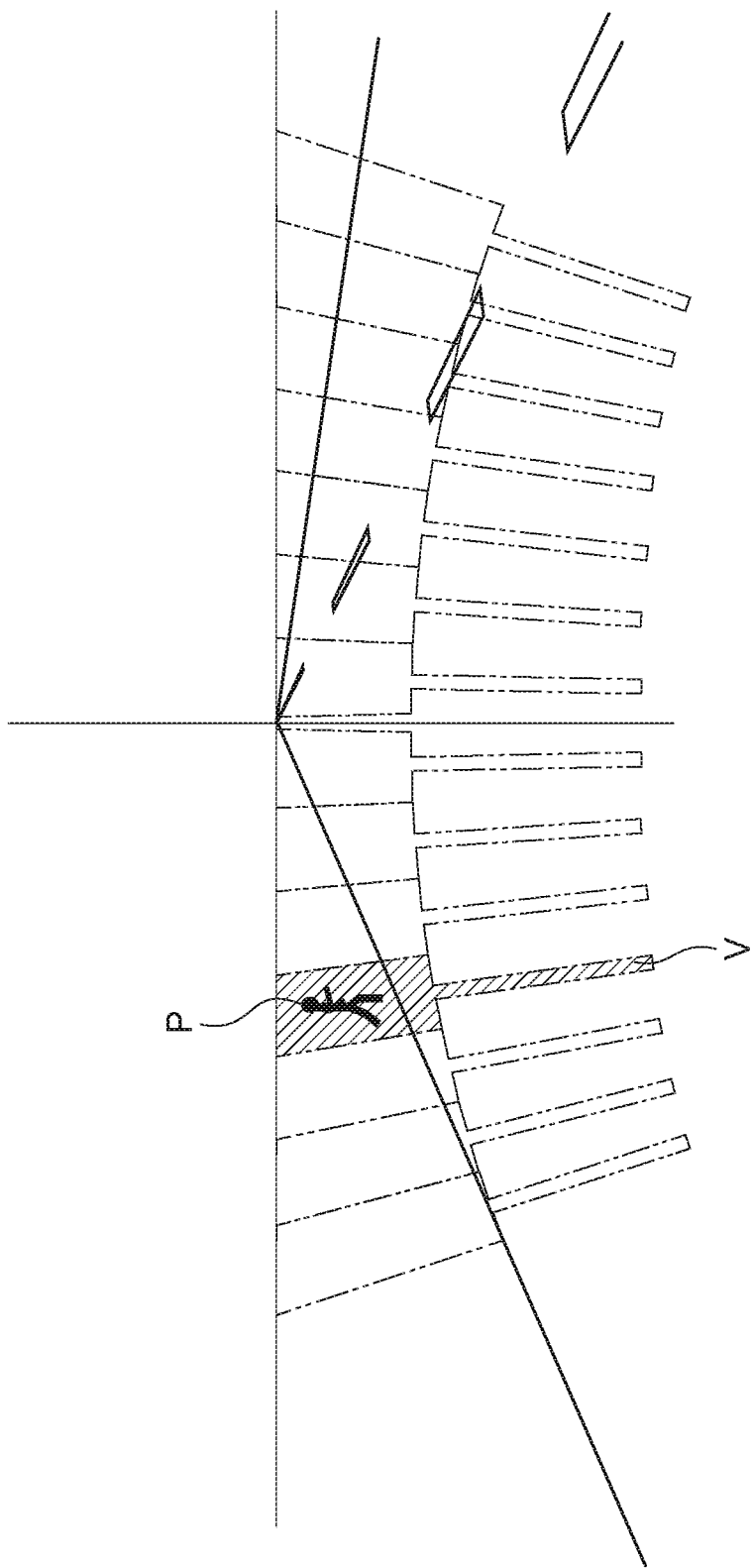

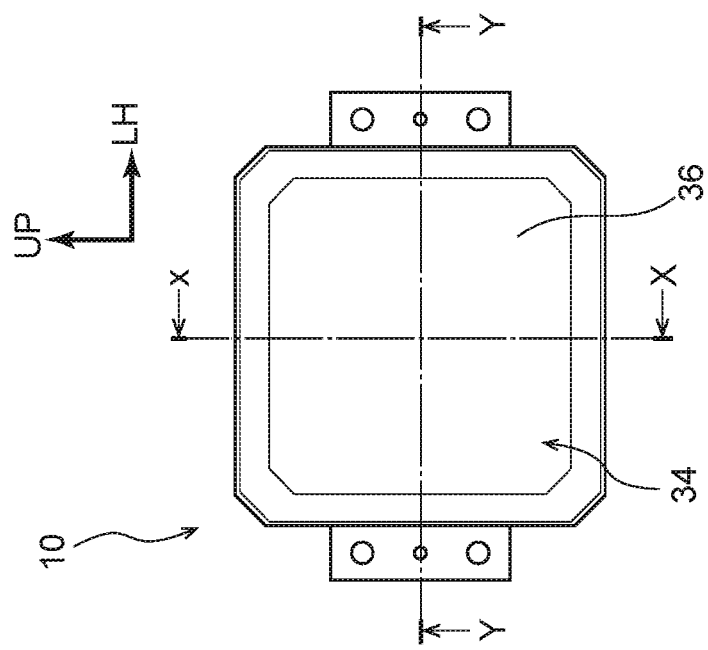

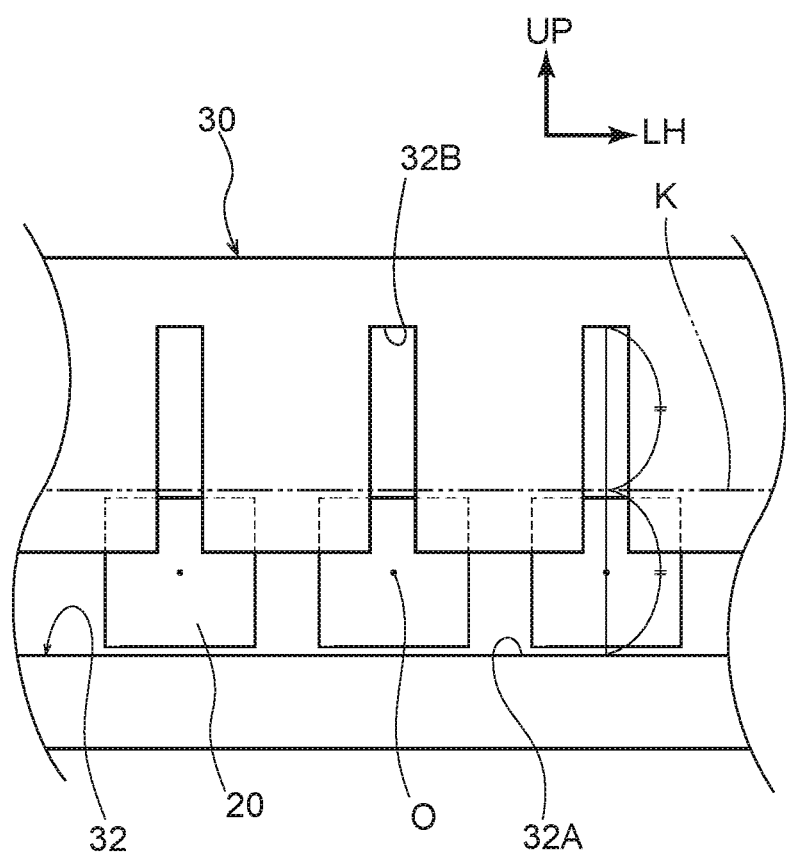

ILLUMINATION DEVICE FOR VEHICLE

CROSS-REFERENCE TO RELATED APPLICATION

This application is based on and claims priority under 35 USC 119 from Japanese Patent Application No. 2017-169879 filed on Sep. 4, 2017, the disclosure of which is incorporated by reference herein.

TECHNICAL FIELD

The present disclosure relates to an illumination device for a vehicle.

RELATED ART

There has conventionally been proposed a mechanism in which, at the time of traveling on a curved road, by controlling a swivel motor that is interlocked with the turning angle, the illuminated light that is illuminated from the headlights is directed toward the side toward which the vehicle is starting to turn, so as to urge the driver to be cautious (see, for example, Japanese Patent Application Laid-Open (JP-A) No. 6-12901 (Patent Document 1)). Further, there also has conventionally been proposed a device in which the light source of a front headlight is structured by LEDs that are disposed in the form of a two-dimensional matrix, and, by lighting only appropriately selected LEDs toward a pedestrian who has been sensed by a camera or the like, light is illuminated onto that pedestrian, so as to urge the driver to be cautious (see, for example, JP-A No. 2013-86663 (Patent Document 2)).

However, in a structure that changes the direction of illuminated light by controlling a swivel motor, it is difficult to illuminate the light accurately toward a desired region due to wobbling or the like at the time when the swivel motor is operated. Further, if only illuminating light by lighting only appropriately selected LEDs among LEDs that are disposed in the form of a two-dimensional matrix, the contrast at the edge portions of the region onto which the light is illuminated is low, and it is difficult to ensure visibility of these edge portions for the driver.

SUMMARY

Thus, an object of the present disclosure is to provide an illumination device for a vehicle that can suppress a decrease in contrast at the edge portions of a region onto which light is illuminated.

An illumination device for a vehicle relating to a first aspect includes: plural light sources that are disposed so as to be lined-up in at least one line, and that illuminate light; a light-blocking member having an opening portion onto which light illuminated from the light sources is incident; and a projecting lens that emits, toward an object, light that has passed through the opening portion of the light-blocking member and has been incident on the projecting lens.

In accordance with the first aspect, the light, which has been illuminated from the plural light sources disposed so as to be lined-up in at least one line and that has passed through the opening portion of the light-blocking member, is emitted toward the object by the projecting lens. Accordingly, a decrease in contrast at the edge portions of the region onto which the light is illuminated is suppressed, as compared with a structure in which this light-blocking member is not provided.

An illumination device for a vehicle of a second aspect is the illumination device for a vehicle of the first aspect that further includes: recognizing unit for recognizing the object; and control unit for lighting, among the plural light sources, only the light sources corresponding to a position of the object recognized by the recognizing unit.

In accordance with the second aspect, the control unit lights, of the plural light sources, only the light sources that correspond to the position of the object recognized by the recognizing unit. Accordingly, as compared with a structure that, for example, changes the direction of the illumination light by controlling a swivel motor, positional offset of the illumination direction with respect to the object, which is due to wobbling at the time of operation of the swivel motor or the like, is suppressed.

An illumination device for a vehicle relating to a third aspect is the illumination device for a vehicle relating to the first or second aspect, wherein, at the light-blocking member, a central portion in a line direction in which the plural light sources are lined-up is formed to be thinner than both end portion sides.

In accordance with the third aspect, the central portion of the light-blocking member in the line direction in which the plural light sources are lined-up is formed to be thinner than both end portion sides. Accordingly, as compared with a structure in which the light-blocking member is made to be a constant thickness, warping at the both end portion sides of the region onto which the light is illuminated is reduced, and a decrease in contrast at the edge portions of these both end portion sides is suppressed.

An illumination device for a vehicle relating to a fourth aspect is the illumination device for a vehicle relating to any one of the first through third aspects, wherein the plural light sources are disposed so as to be lined-up in a vehicle transverse direction, and the opening portion of the light-blocking member is formed in a shape of a comb in which a lower portion opening whose length direction is the vehicle transverse direction, and plural upper portions openings that project-out from the lower portion opening in a vehicle upward direction, respectively face the plural light sources.

In accordance with the fourth aspect, the plural light sources are disposed so as to be lined-up in the vehicle transverse direction, and the opening portion of the light-blocking member is formed in the shape of a comb in which a lower portion opening whose length direction is the vehicle transverse direction, and plural upper portions openings that project-out from the lower portion opening in the vehicle upward direction, face the plural light sources respectively. Accordingly, at the vehicle side, the region onto which the light is illuminated is linear, and it is easy for the driver to recognize the direction in which the object exists. At the object side, the region onto which the light is illuminated is wide, and a decrease in the contrast at the edge portions of this region is further suppressed.

An illumination device for a vehicle relating to a fifth aspect is the illumination device for a vehicle relating to any one of the first through third aspects, wherein the plural light sources are disposed so as to be lined-up in a vehicle transverse direction, and the opening portion of the light-blocking member is formed in upside-down T-shapes that face the plural light sources respectively.

In accordance with the fifth aspect, the plural light sources are disposed so as to be lined-up in the vehicle transverse direction, and the opening portion of the light-blocking member is formed in upside-down T-shapes that respectively face the plural light sources. Accordingly, at the vehicle side, the region onto which the light is illuminated is linear, and it is easy for the driver to recognize the direction in which the object exists. At the object side, the region onto which the light is illuminated is wide, and a decrease in the contrast at the edge portions of this region is further suppressed.

An illumination device for a vehicle relating to a sixth aspect is the illumination device for a vehicle relating to the fourth or fifth aspect, wherein the plural light sources are made to be in only one line and are disposed such that centers of the light sources are positioned further toward a lower side than a vehicle vertical direction central portion of the opening portion of the light-blocking member.

In accordance with the sixth aspect, the centers of the plural light sources that are made to be in only one line are positioned further toward the lower side than the vehicle vertical direction central portion of the opening portion of the light-blocking member. Accordingly, as compared with a structure in which the centers of the respective light sources are positioned at the vehicle vertical direction central portion of the opening portion of the light-blocking member, the light that is blocked by the light-blocking member is reduced, and a decrease in the contrast at the upper edge portion and the lower edge portion of the region onto which the light is illuminated is suppressed.

An illumination device for a vehicle relating to a seventh aspect is the illumination device for a vehicle relating to any one of the first through the fifth aspects, wherein the plural light sources are disposed so as to be lined-up in two or more lines.

In accordance with the seventh aspect, the plural light sources are disposed so as to be lined-up in two or more lines. Accordingly, as compared with a structure in which the plural light sources are lined-up in only one line, the amount of light that is illuminated is increased, and a decrease in contrast at the edge portions of the region onto which the light is illuminated is suppressed more effectively.

An illumination device for a vehicle relating to an eighth aspect is the illumination device for a vehicle relating to any one of the first through the seventh aspects, wherein the projecting lens is structured by plural image forming lenses.

In accordance with the eighth aspect, the projecting lens is structured by plural image forming lenses. Accordingly, as compared with a case in which the projecting lens is structured by a single lens, a decrease in the contrast at the edge portions of the region onto which the light is illuminated is suppressed more effectively.

In accordance with the first aspect, a decrease in the contrast at the edge portions of the region onto which light is illuminated can be suppressed.

In accordance with the second aspect, positional offset of the illuminating direction with respect to the object can be suppressed.

In accordance with the third aspect, a decrease in the contrast at the edge portions of the both end portions sides of the region onto which light is illuminated can be suppressed.

In accordance with the inventions relating to the fourth and fifth aspects, a decrease in the contrast at the edge portions of the region onto which light is illuminated can be suppressed more.

In accordance with the sixth aspect, a decrease in the contrast at the upper edge portion and the lower edge portion of the region onto which light is illuminated can be suppressed.

In accordance with the inventions relating to the seventh and eighth aspects, a decrease in the contrast at the edge portions of the region onto which light is illuminated can be suppressed more effectively.

BRIEF DESCRIPTION OF THE DRAWINGS

FIG. 7 is an explanatory drawing showing a region onto which light is illuminated by the illumination device for a vehicle relating to the second embodiment.

FIG. 8 is a front view showing the light sources and the light-blocking member of an illumination device for a vehicle relating to a third embodiment.

FIG. 9 is an explanatory drawing showing a region onto which light is illuminated by the illumination device for a vehicle relating to the third embodiment.

FIG. 10A is a front view of an illumination device for a vehicle relating to a fourth embodiment.

FIG. 15A is a front view showing the positional relationship between an opening portion of the light-blocking member and the light sources relating to the fourth embodiment.

DETAILED DESCRIPTION

Embodiments relating to the present disclosure are described in detail hereinafter on the basis of the drawings. Note that, for convenience of explanation, arrow UP that is shown appropriately in the respective drawings indicates the vehicle upward direction, arrow FR indicates the vehicle frontward direction, and arrow LH indicates the vehicle leftward direction. Accordingly, in the following description, when vertical, longitudinal and left-right directions are used without being specified, they refer to the vertical of the vehicle vertical direction, the longitudinal of the vehicle longitudinal direction, and the left and the right of the vehicle left-right direction (the vehicle transverse direction).

Figure 1:
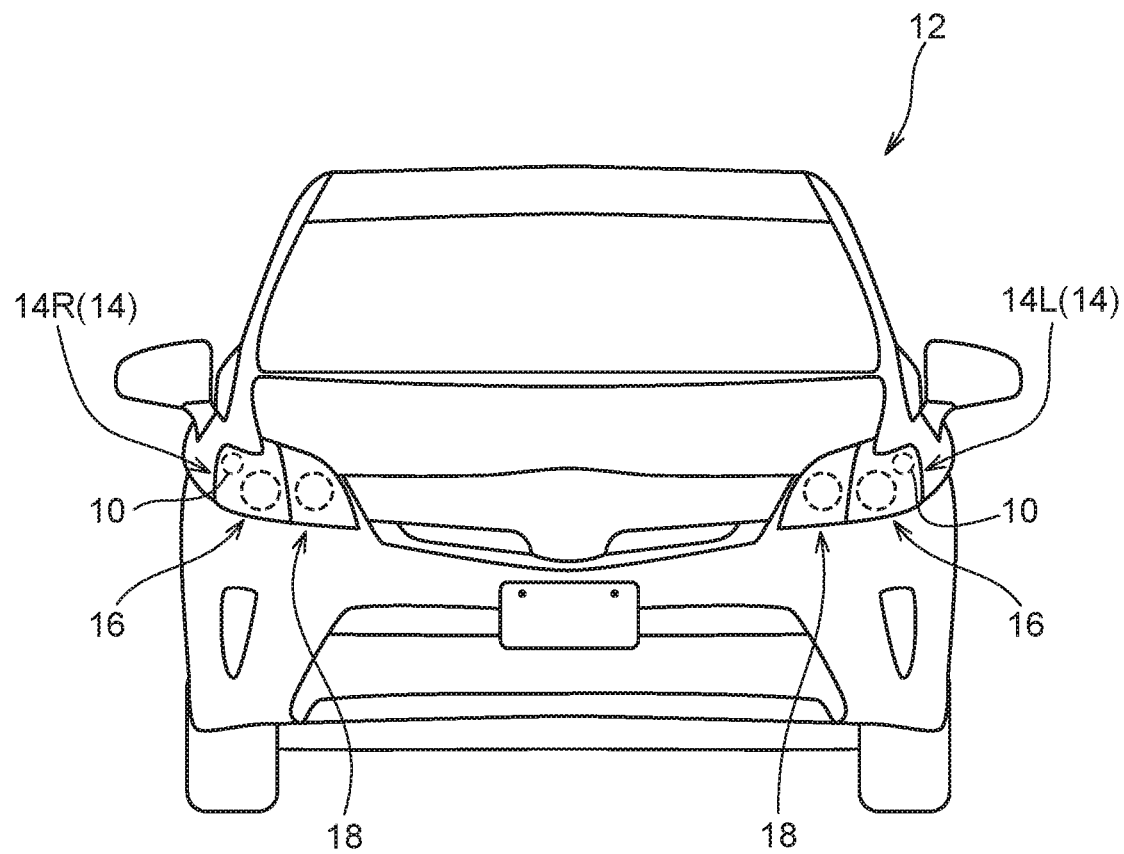
FIG. 1 is a front view showing a vehicle in which illumination devices for a vehicle relating to present embodiments are installed.

As shown in FIG. 1, a pair of left and right headlamp units 14 for ensuring the field of view at the front side of a vehicle 12 are provided at the vehicle 12. Namely, a headlamp unit 14R is disposed at the right side front end portion of the vehicle 12, and a headlamp unit 14L is disposed at the light side front end portion of the vehicle 12.

Each of the headlamp unit 14R and the headlamp unit 14L is structured to include a low beam unit 16 that structures the vehicle transverse direction outer side portion, and a high beam unit 18 that structures the vehicle transverse direction inner side portion. The headlamp unit 14R and the headlamp unit 14L are structured so as to have left-right symmetry in the vehicle transverse direction.

The low beam unit 16 is structured so as to illuminate light (visible light) onto a low beam light distribution area that is on the road surface at the front side of the vehicle 12. The high beam unit 18 is structured so as to illuminate light (visible light) onto a high beam light distribution area that is further toward an obliquely upper and front side than the low beam light distribution area that is illuminated by the low beam unit 16. Moreover, an illumination device 10 for a vehicle relating to the present embodiment is provided at the vehicle transverse direction outer side of the low beam unit 16.

First Embodiment

Figure 2:
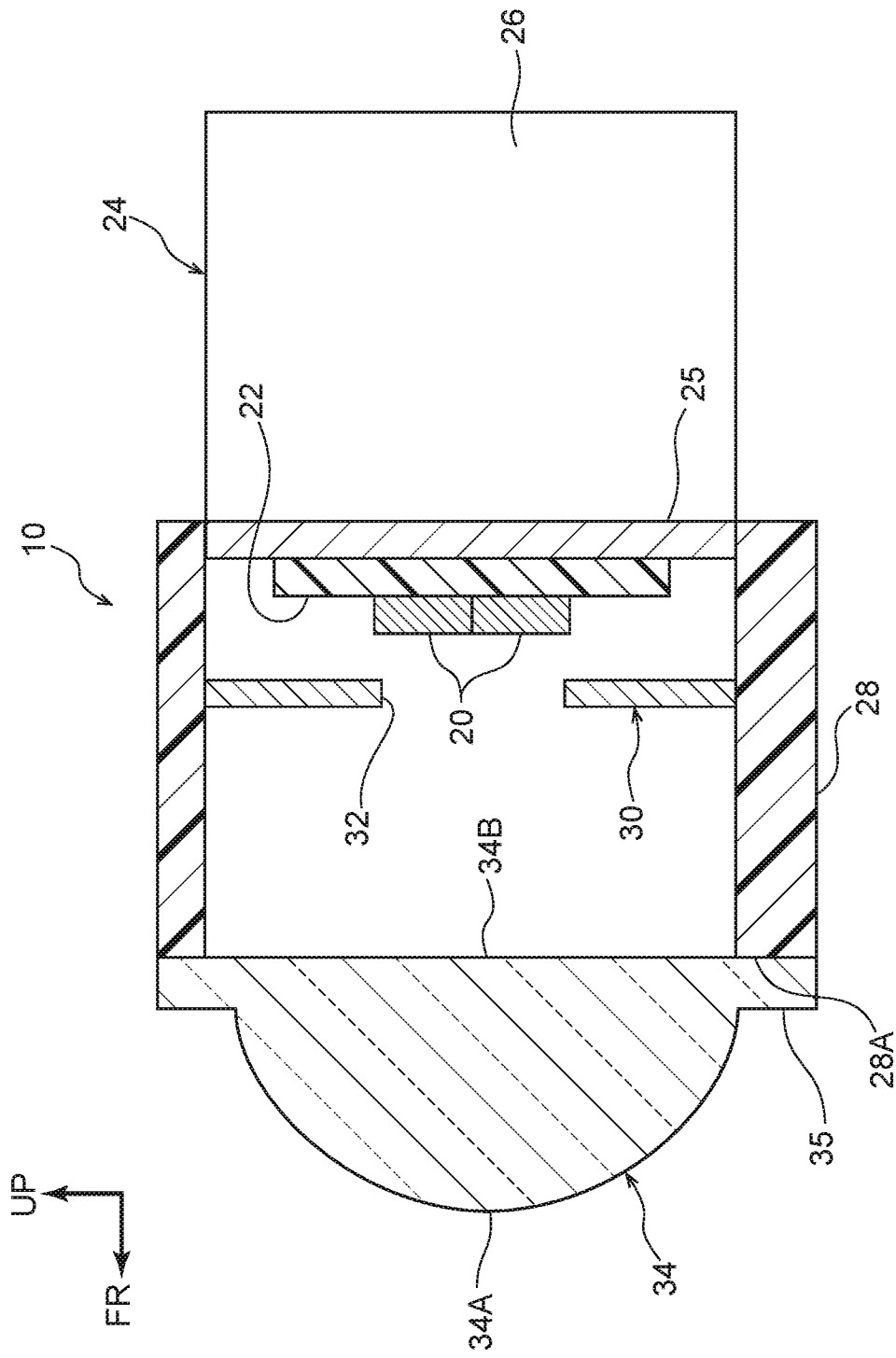
FIG. 2 is a side sectional view showing the schematic structure of an illumination device for a vehicle relating to a first embodiment.

First, the illumination device 10 for a vehicle relating to the first embodiment is described. As shown in FIG. 2, the illumination device 10 for a vehicle has plural light sources 20 that illuminate light (visible light), a light-blocking member 30 having opening portions 32 on which the light illuminated from the respective light sources 20 is incident, and a projecting lens 34 that emits the light, that has passed through the opening portions 32 of the light-blocking member 30 and is incident on the projecting lens 34, toward an object (as an example, a pedestrian walking on the shoulder or an automobile traveling on the shoulder or the like, that there is the concern that the vehicle 12 may collide with, hereinafter called "pedestrian P", see FIG. 5).

Figure 3:
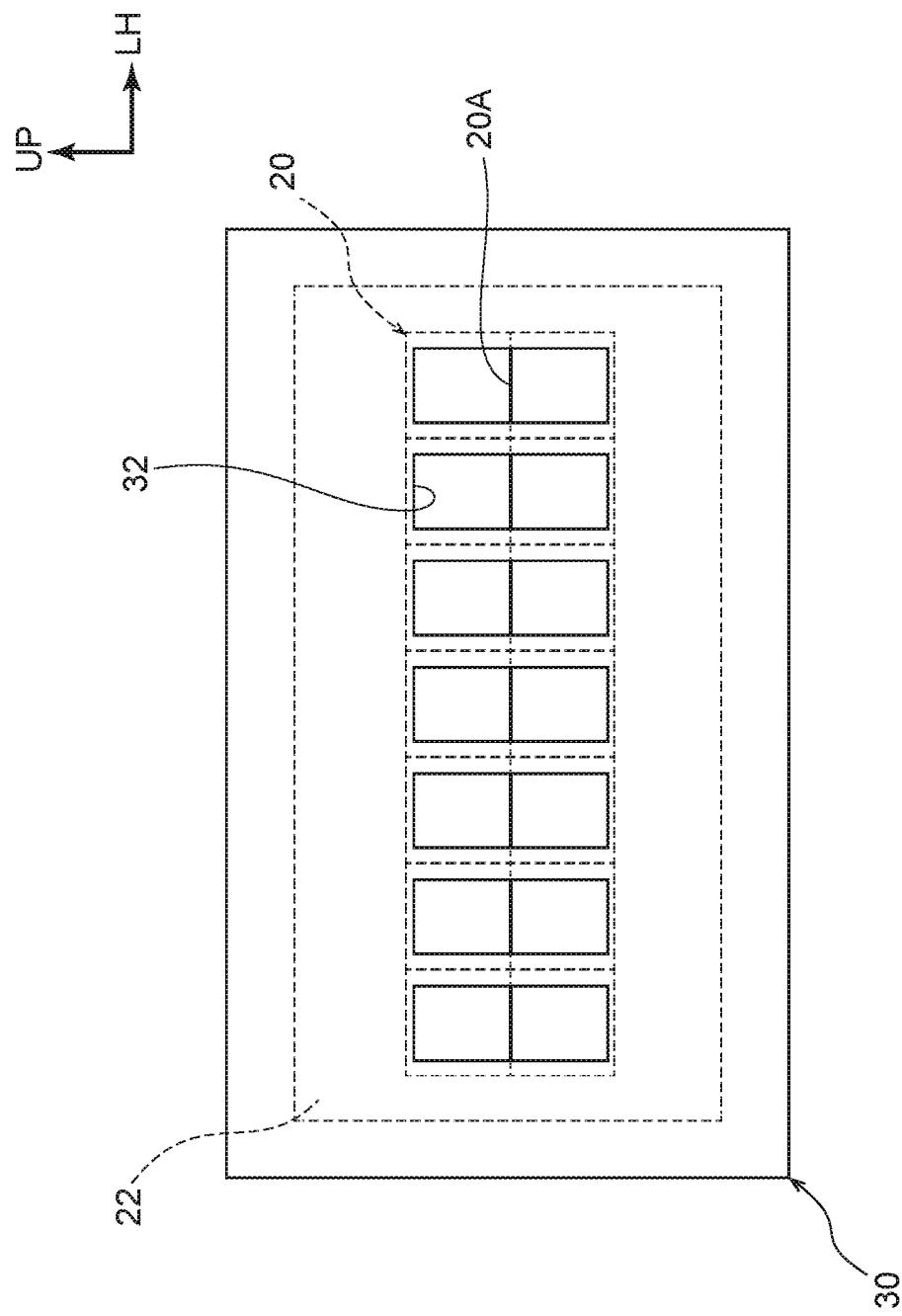
FIG. 3 is a front view showing light sources and a light-blocking member of the illumination device for a vehicle relating to the first embodiment.
Figure 4:
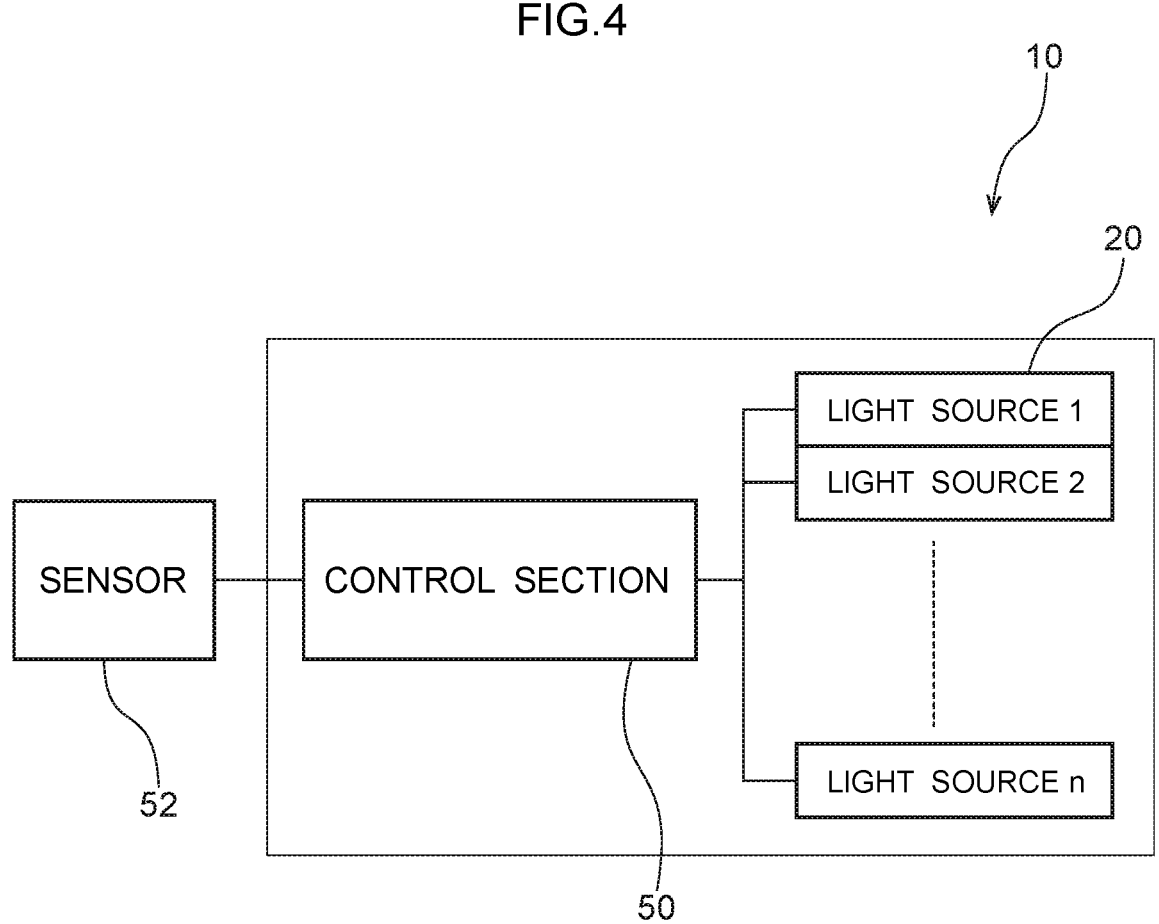
FIG. 4 is a block drawing showing a control system of the illumination device for a vehicle relating to the first embodiment.

The light sources 20 are high-intensity light sources such as light-emitting diodes (LEDs) or the like, and are provided so as to be lined-up in two lines on a substrate 22 that is electrically connected to a control section 50 (see FIG. 4). In further detail, as shown in FIG. 3, seven of the light sources 20 are lined-up with substantially no spaces therebetween in one line in the vehicle transverse direction on the front surface (one surface) of the substrate 22 that is made of resin, and two of these (two lines) are disposed so as to be lined-up in the vehicle vertical direction with substantially no space therebetween.

Namely, 14 (=7×2) of the light sources 20 are provided so as to be lined-up in the form of a two-dimensional matrix on the substrate 22. Note that the number of the light sources 20 that are provided on the substrate 22 is not limited to the illustrated 14. Further, in order to simplify the drawings, the light sources 20 are expressed by being drawn schematically in rectangular shapes (square shapes), but are not limited to these rectangular shapes.

As shown in FIG. 2, the substrate 22 is provided on a heat dissipating member 24 that is made of metal. The heat dissipating member 24 is structured by plural fins 26 (refer to FIG. 13A and FIG. 13B as well), which are shaped as rectangular flat plates and whose normal directions are the vehicle transverse direction, projecting-out integrally at the rear surface of a main body portion 25 that is substantially rectangular plate shaped and whose normal direction is the vehicle longitudinal direction. Namely, the rear surface (other surface) of the substrate 22 is mounted to the front surface of the main body portion 25, and heat generated from the light sources 20 is dissipated into the atmosphere by the fins 26.

Further, the heat dissipating member 24 is integrally mounted to the rear end portion of a holder 28 that is made of resin and that holds the projecting lens 34. The holder 28 is formed substantially in the shape of a cylindrical tube whose optical axis direction is the longitudinal direction, and is structured such that the rear opening of the holder 28 is closed-off by the main body portion 25 of the heat dissipating member 24.

As seen in a plan view and in a side view, the projecting lens 34 is formed in the shape of a curved surface whose front surface 34A is convex toward the front side, and a rear surface 34B thereof is formed in a planar shape. A projecting portion 35, which projects-out toward the radial direction outer side in a concentrically circular shape, is formed integrally with the peripheral edge portion of the rear side of the projecting lens 34 over the entire periphery (peripheral direction). This projecting portion 35 is joined by laser welding to a front end portion (hereinafter called seating surface) 28A of the holder 28.

Namely, due to a laser beam (not illustrated) that is illuminated from the front side being transmitted through the projecting portion 35 that is made to abut the seating surface 28A of the holder 28, and the seating surface 28A of the holder 28 being fused, the projecting portion 35 is welded (joined) to the seating surface 28A of the holder 28. Due thereto, there is a structure in which the front opening of the holder 28 is closed-off by the projecting lens 34.

The projecting lens 34 is structured such that the light, that has been transmitted through the opening portions 32 of the light-blocking member 30 and is incident on the rear surface 34B, is made into parallel light by being transmitted from the rear surface 34B toward the front surface 34A, and exits from the front surface 34A. Due thereto, the light (visible light) that has been made into parallel light is illuminated toward the front side of the vehicle 12 (is made into illumination light V).

The light-blocking member 30 is provided within the holder 28 via a supporting member (not illustrated). The light-blocking member 30 is formed in the shape of a rectangular flat plate at which the length of the diagonal line thereof is smaller than the inner diameter of the holder 28. As shown in FIG. 3, seven of the opening portions 32, that are rectangular and whose length directions are the vehicle vertical direction and that are one size smaller than the two upper/lower light sources 20, are formed so as to be lined-up (at a uniform interval) in one line in the vehicle transverse direction at the substantially central portion of the light-blocking member 30.

Namely, the light-blocking member 30 is disposed at the front side of the respective light sources 20 (so as to face the two upper/lower light sources 20 in the optical axis direction), such that a border portion 20A of the two upper/lower light sources 20 is positioned at the vertical direction central portion of the respective opening portions 32. The light (visible light) that has passed through these opening portions 32 is incident on the rear surface 34B of the projecting lens 34, and exits from the front surface 34A of the projecting lens 34.

Further, as shown in FIG. 4, the illumination device 10 for a vehicle has a sensor (an image sensor) 52 that serves as a recognizing unit for recognizing the pedestrian P who serves as an object, and the control section 50 that serves as a control unit that lights, of the plural light sources 20, only the light sources 20 that correspond to the position of the pedestrian P recognized by the sensor 52.

Namely, due to the control section 50 appropriately selecting and controlling the light sources 20 that are to be lit from among the plural light sources 20 on the basis of the results of sensing (recognition) by the sensor 52, the illumination device 10 for a vehicle can illuminate (project) light (visible light) toward at least the feet of the pedestrian P that there is the concern that the vehicle 12 will collide with (who is walking on the shoulder).

Operation of the illumination device 10 for a vehicle, which relates to the first embodiment and is structured as described above, is described next While the vehicle 12 is traveling at night (including cases in which the vehicle 12 is stopped temporarily at a traffic light or a train crossing or the like) in a state in which at least the light sources (not illustrated) of the low beam units 16 are lit (i.e., a state in which light is illuminated toward the low beam distribution areas at the front side of the vehicle 12), the sensor 52 continues sensing the pedestrian P who is walking on the shoulder.

Figure 5:
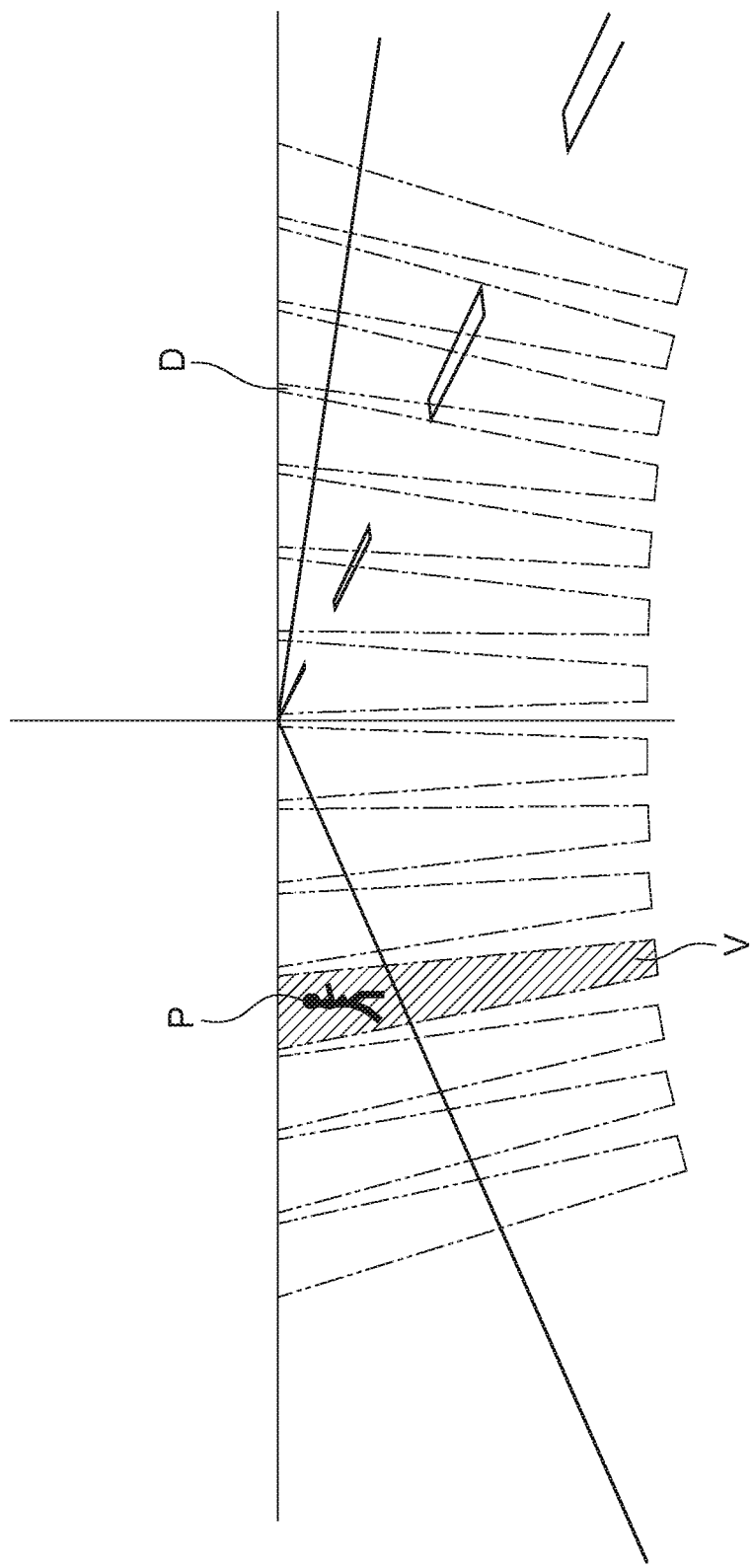
FIG. 5 is an explanatory drawing showing a region onto which light is illuminated by the illumination device for a vehicle relating to the first embodiment.

If the sensor 52 senses (recognizes) the pedestrian P who is, for example, walking on the shoulder at the left side in the advancing direction of the vehicle 12 and that there is the concern that the vehicle 12 will collide with, the control section 50 lights, among the plural light sources 20 of the illumination device 10 for a vehicle, only the light sources 20 corresponding to the position of the pedestrian P recognized by the sensor 52. Thereupon, the light that is illuminated from these light sources 20 passes through the opening portion 32 of the light-blocking member 30, and further, is transmitted through the projecting lens 34 from the rear toward the front. Due thereto, as shown in FIG. 5, the illumination light V is illuminated toward the pedestrian P.

Here, the light that is illuminated from the light sources 20 passes through the opening portion 32 of the light-blocking member 30, and thereafter, is incident on the rear surface 34B of the projecting lens 34. Accordingly, as compared with a structure in which the light-blocking member 30 is not provided (i.e., in which the light does not pass through the opening portion 32), light that corresponds to the shape of the opening portion 32 can be illuminated, and a decrease in the contrast at the edge portions of the region onto which the light is illuminated can be suppressed. Accordingly, the ability of the driver to view the pedestrian P can be improved.

In particular, because the light sources 20 are disposed so as to be lined-up in two lines, the amount of light that is illuminated can be increased as compared with a structure in which the light sources 20 are lined-up in only one line. Accordingly, a decrease in the contrast at the edge portions of the region onto which the light is illuminated can be suppressed more effectively, and the ability of the driver to view the pedestrian can be improved even more.

Further, it suffices for the control section 50 to light, of the plural light sources 20, only the light sources 20 that correspond to the position of the pedestrian P who has been sensed (recognized) by the sensor 52. Therefore, as compared with a structure in which, for example, the direction of the illuminated light is changed by the control of a swivel motor, positional offset of the direction of illuminating the light onto the pedestrian P, which is due to wobbling or a delay in control (transmission) at the time of operating (rotating) the swivel motor, can be suppressed or prevented.

Note that the reason why the illumination light V that is shown in FIG. 5 is at one place is that there is the one pedestrian P. In a case in which there are plural pedestrians P, there are also plural illumination lights V. Further, even in a case in which there is one pedestrian P, if the position of that pedestrian P is sensed as (recognized as being) a dark region D that is a position where light is not illuminated (a position between the illumination lights V), control is carried out such that light is illuminated toward the both sides thereof (there are two of the illumination lights V).

Second Embodiment

The illumination device 10 for a vehicle relating to the second embodiment is described next. Note that regions that are equivalent to those of the above-described first embodiment are denoted by the same reference numerals, and detailed description thereof (including description of common operation) is omitted as appropriate.

Figure 6:
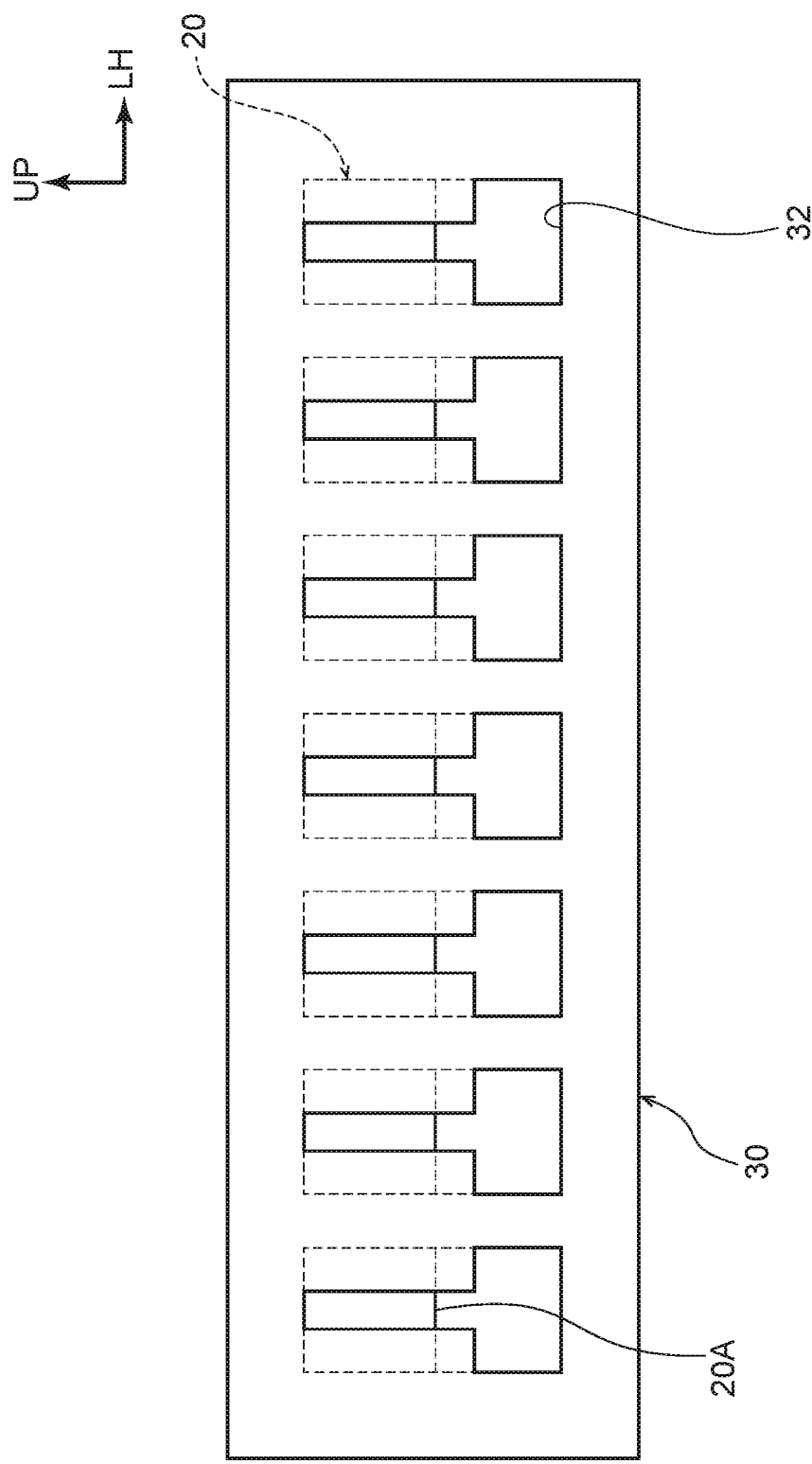
FIG. 6 is a front view showing the light sources and the light-blocking member of an illumination device for a vehicle relating to a second embodiment.

As shown in FIG. 6, in the illumination device 10 for a vehicle relating to the second embodiment, only the shape of the opening portions 32 at the light-blocking member 30 differs from the first embodiment. Namely, the opening portions 32 of this light-blocking member 30 are formed in upside-down T-shapes that are the same height as that of the two upper/lower light sources 20 and that face the light sources 20 in the optical axis direction. When the opening portions 32 of the light-blocking member 30 are made to be such a shape, as shown in FIG. 7, the light that is transmitted through the projecting lens 34 is turned upside-down, and therefore, becomes the illumination light V that is T-shaped.

Accordingly, as shown in FIG. 7, at the vehicle 12 side, the region onto which light is illuminated is linear, and it is easy for the driver to recognize the direction in which the pedestrian P exists. At the pedestrian P side, the region at which the light is illuminated toward the pedestrian P is wide and a decrease in the contrast at the edge portions of this region can be further suppressed, more so than in the case of the first embodiment that is shown in FIG. 5. Accordingly, as compared with the first embodiment, the ability of the driver to see the pedestrian P that there is the concern that the vehicle 12 will collide with can be improved further.

Third Embodiment

The illumination device 10 for a vehicle relating to the third embodiment is described next. Note that regions that are equivalent to those of the above-described first embodiment and second embodiment are denoted by the same reference numerals, and detailed description thereof (including description of common operation) is omitted as appropriate.

As shown in FIG. 8, in the illumination device 10 for a vehicle relating to the third embodiment, only the shape of the opening portion 32 at the light-blocking member 30 differs from the first embodiment and the second embodiment. Namely, the opening portion 32 of this light-blocking member 30 is a shape in which the upside-down T-shaped opening portions 32 of the second embodiment are continuous in the vehicle transverse direction.

In other words, at the opening portion 32 of this light-blocking member 30, a lower portion opening 32A which is rectangular and whose length direction is the vehicle transverse direction (the line direction in which the plural light sources 20 are lined-up), and plural upper portion openings 32B that are slender and that project upward from the lower portion opening 32A at a uniform interval in the vehicle transverse direction, are formed in the shape of a comb that faces the two upper/lower light sources 20.

When the opening portions 32 of the light-blocking member 30 are formed in the shape of a comb in this way, as shown in FIG. 9, at the vehicle 12 side, the region onto which light is illuminated is linear, and it is easy for the driver to recognize the direction in which the pedestrian P exists. At the pedestrian P side, the region at which the light is illuminated toward the pedestrian P is wider than in the case of the first embodiment that is shown in FIG. 5 and the second embodiment that is shown in FIG. 7, and the adjacent regions are continuous.

Accordingly, a decrease in the contrast at the edge portions of the region onto which the light is illuminated can be suppressed more, and the dark regions D that are formed in the first embodiment shown in FIG. 5 and the second embodiment shown in FIG. 7 can be eliminated. Due thereto, the illumination light V not being illuminated appropriately onto the pedestrian P that there is the concern that the vehicle 12 will collide with, or two or more of the illumination lights V being needed for the one pedestrian P, can be suppressed or prevented.

Fourth Embodiment

Finally, the illumination device 10 for a vehicle relating to the fourth embodiment is described. Note that regions that are equivalent to those of the above-described first embodiment through third embodiment are denoted by the same reference numerals, and detailed description thereof (including description of common operation) is omitted as appropriate.

As shown in FIGS. 10A and 10B through FIGS. 12A, 12B and 12C, in the fourth embodiment, seven of the light sources 20 are disposed in one line in the vehicle transverse direction at the front surface (the one surface) of the substrate 22. Namely, in the fourth embodiment, there is only one line of the light sources 20. Further, optical lenses 40 are provided at the front sides of the respective light sources 20 in states of contacting them.

Seven of the optical lenses 40 are formed in one line in the vehicle transverse direction in correspondence with the respective light sources 20, and are connected integrally in the vehicle transverse direction. The optical lenses 40 are structured so as to emit light, that is incident from the rear surfaces thereof, from the front surfaces thereof such that the light is diffused upward, downward, leftward and rightward. Due thereto, the number of the light sources 20 can be made to be a smaller number of the total light-emitting surface area than the opening surface areas of the opening portions 32.

In other words, even though the light sources 20 are provided in only one line in the vehicle transverse direction, the amount of light that exits from the projecting lens 34 can be ensured. Note that in FIG. 12A, FIG. 12B and FIG. 12C, the substrate 22 is omitted, and only the light sources 20 and the optical lenses 40 are illustrated. Further, a pair of left and right brackets 42 for mounting the optical lenses 40 to the front surface of the substrate 22 are provided integrally with the vehicle transverse direction both end portions of the optical lenses 40.

Figure 10B:
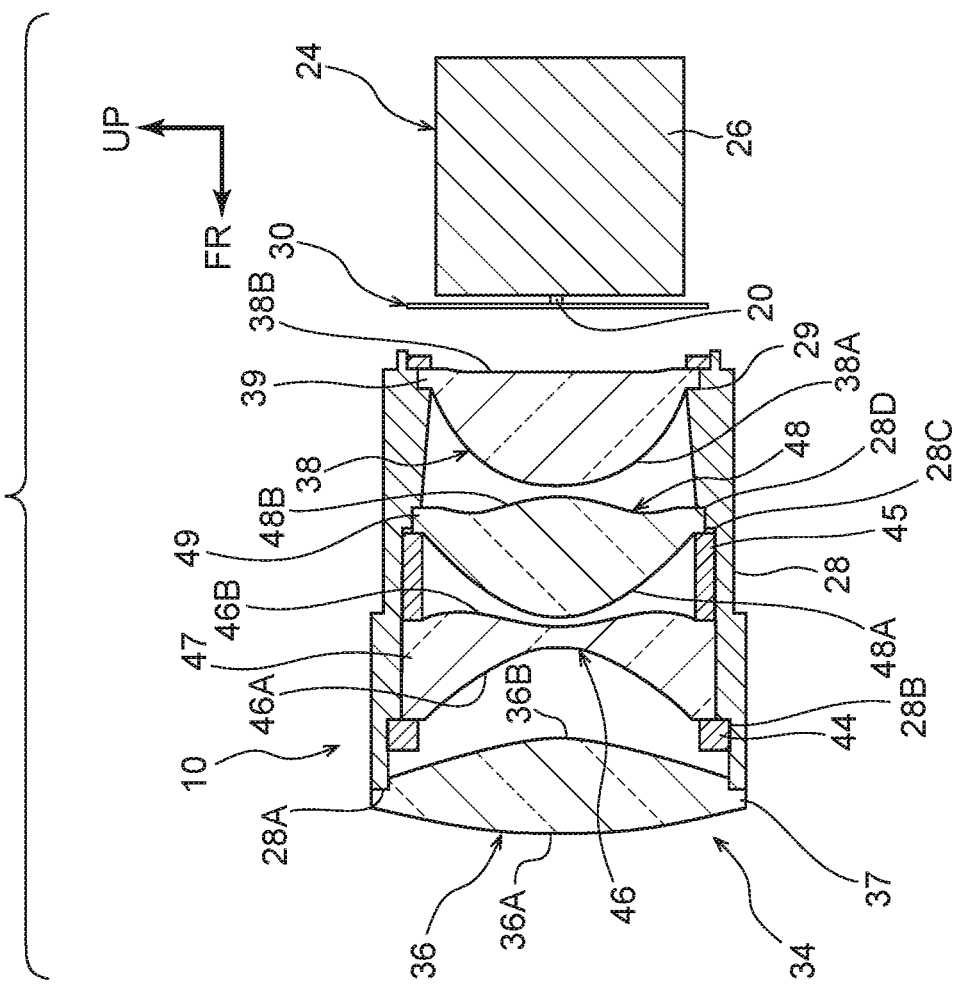
FIG. 10B is a schematic sectional view that is viewed in the direction of the X-X arrow line of FIG. 10A, and in which a portion of the illumination device for a vehicle relating to the fourth embodiment is omitted.
Figure 11:
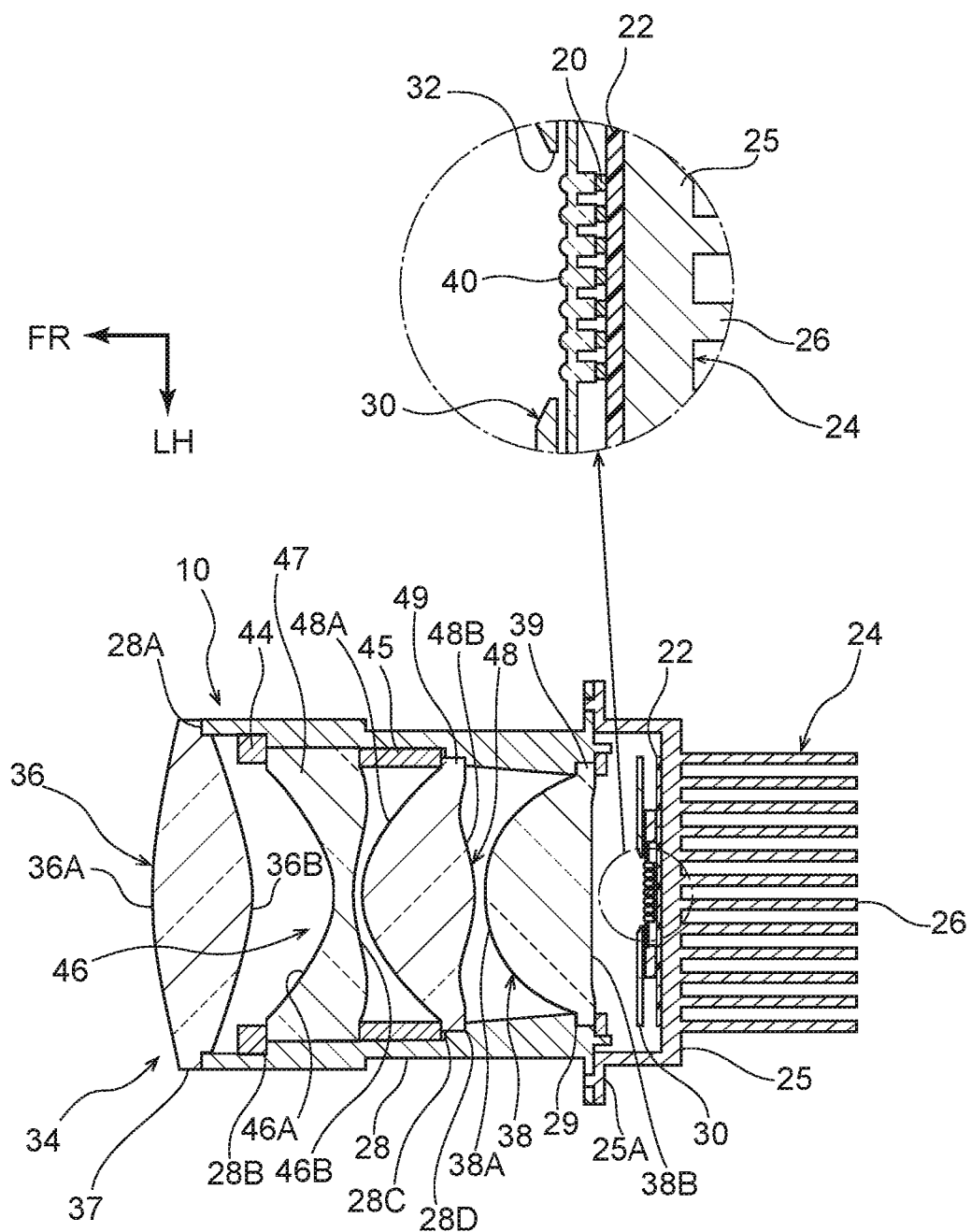
FIG. 11 is a schematic sectional view that is viewed in the direction of the Y-Y arrow line of FIG. 10A, and in which a portion of the illumination device for a vehicle relating to the fourth embodiment is enlarged.
Figure 12A:
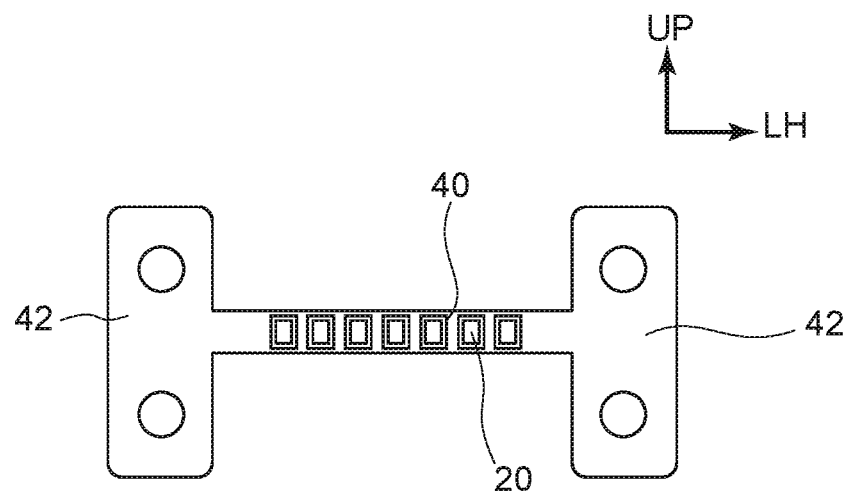
FIG. 12A is a rear view showing an optical lens of the illumination device for a vehicle relating to the fourth embodiment.
Figure 12B:
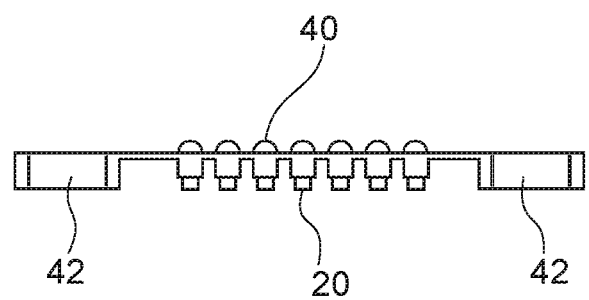
FIG. 12B is a plan view showing the optical lens of the illumination device for a vehicle in the fourth embodiment.
Figure 12C:
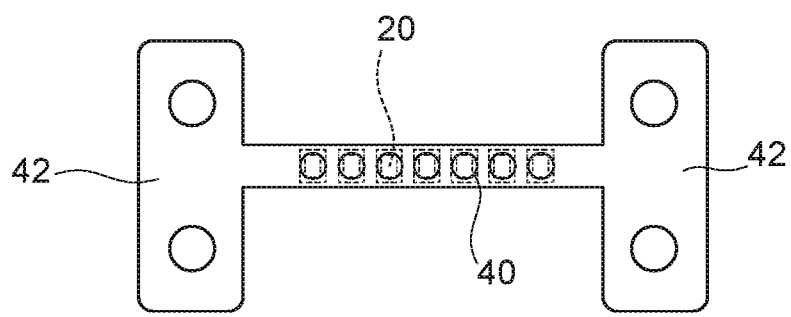
FIG. 12C is a front view showing the optical lens of the illumination device for a vehicle in the fourth embodiment.

Further, as shown in FIG. 10A, FIG. 10B and FIG. 11, the substrate 22 is provided on the heat dissipating member 24 that is made of metal. Namely, the rear surface (the other surface) of the substrate 22 is mounted to the front surface of the main body portion 25 of the heat dissipating member 24. Heat generated from the light sources 20 is dissipated into the atmosphere by the fins 26 of the heat dissipating member 24.

Further, joining portions 25A for joining to the holder 28 are formed integrally at the vehicle transverse direction both end portions of the main body portion 25 of the heat dissipating member 24. The projecting lens 34 that is a group of image forming lenses is provided at the holder 28. In detail, the projecting lens 34 is structured by plural (in this case, four) image forming lenses 36, 38, 46, 48 that are lined-up in the optical axis direction and have respectively different refractive indices.

As seen in a plan view and a side view, at the image forming lens 36 that is at the frontmost side, a front surface 36A thereof is formed in the shape of a curved surface that is convex toward the front side, and a rear surface 36B thereof also is formed in the shape of a curved surface that is convex toward the rear side. A projecting portion 37, which projects-out in the form of a concentric circle toward the radial direction outer side, is formed integrally with the peripheral edge portion of the image forming lens 36 over the entire periphery (peripheral direction) thereof. The projecting portion 37 is joined by laser welding to the seating surface 28A of the holder 28.

Namely, the projecting portion 37 of the image forming lens 36 is welded to the seating surface 28A of the holder 28 due to a laser beam (not illustrated), that is illuminated from the front side, being transmitted through the projecting portion 37 that abuts the seating surface 28A of the holder 28, and fusing the seating surface 28A of the holder 28.

Further, as seen in a plan view and a side view, at the image forming lens 38 that is at the rearmost side, a front surface 38A thereof is formed in the shape of a curved surface that is convex toward the front side, and a rear surface 38B thereof is formed in a planar shape. A projecting portion 39, which projects-out in the form of a concentric circle toward the radial direction outer side, is formed integrally with the peripheral edge portion of the image forming lens 38 over the entire periphery (peripheral direction) thereof.

A step portion 29 that makes the inner diameter of the holder 28 small is formed integrally with the rear end portion of the holder 28 over the entire periphery (peripheral direction) thereof. Accordingly, the image forming lens 38 is inserted into the holder 28 such that the front surface of the projecting portion 39, which is formed at the peripheral edge portion of the image forming lens 38, abuts the rear surface of the step portion 29, and the projecting portion 39 is joined by laser welding to the step portion 29.

Namely, the projecting portion 39 of the image forming lens 38 is welded to the step portion 29 of the holder 28 due to a laser beam (not illustrated), that is illuminated from the rear side, being transmitted through the projecting portion 39 that abuts the rear surface of the step portion 29 of the holder 28, and fusing the rear surface of the step portion 29.

The image forming lenses 46, 48 are disposed within the holder 28 between the image forming lens 36 that is at the frontmost side and the image forming lens 38 that is at the rearmost side. At the interior of the holder 28, as seen in a plan view and a side view, at the image forming lens 46 that is at the front side, a front surface 46A thereof is formed in the shape of a curved surface that is concave toward the rear side, and a rear surface 46B thereof also is formed in the shape of a curved surface that is concave toward the front side.

On the other hand, at the interior of the holder 28, as seen in a plan view and a side view, at the image forming lens 48 that is at the rear side, a front surface 48A thereof is formed in the shape of a curved surface that is convex toward the front side, and a rear surface 48B thereof also is formed in the shape of a curved surface that is convex toward the rear side. Further, the image forming lenses 46, 48 are fixed to the interior of the holder 28 by annular fixing members 44, 45, respectively.

In detail, in addition to the above-described step portion 29, a first step portion 28B, a second step portion 28C and a third step portion 28D, whose inner diameters become smaller in order from the front side, are formed integrally with the inner peripheral surface of the holder 28 over the entire periphery (peripheral direction) thereof. The fixing member 44 is formed to an outer diameter and an inner diameter that are such that the rear surface of the fixing member 44 can abut the first step portion 28B. The fixing member 45 is formed to an outer diameter and an inner diameter that are such that the rear surface of the fixing member 45 can face (abut) the second step portion 28C.

Accordingly, the image forming lenses 46, 48 are fixed to the interior of the holder 28 as follows. Namely, before the image forming lenses 36, 46 are provided, the image forming lens 48 is inserted into the holder 28 from the front side, and the rear surface of a peripheral edge portion 49 of the image forming lens 48 is made to abut the third step portion 28D. Next, the fixing member 45 is inserted into the holder 28 from the front side, and the front surface of the peripheral edge portion 49 of the image forming lens 48 is pushed by the rear surface of the fixing member 45.

Note that, at this time, the fixing member 45 may be joined to the inner peripheral surface of the holder 28 by an adhesive or the like. Further, in the illustrated structure, due to the thickness of the peripheral edge portion 49 of the image forming lens 48, the rear surface of the fixing member 45 faces the second step portion 28C in the optical axis direction without abutting the second step portion 28C. However, depending on the thickness of the peripheral edge portion 49 of the image forming lens 48, there may be a structure in which the rear surface of the fixing member 45 abuts the second step portion 28C.

Next, the image forming lens 46 is inserted into the holder 28 from the front side, and the rear surface of a peripheral edge portion 47 of the image forming lens 46 is made to abut the front surface of the fixing member 45. Then, the fixing member 44 is inserted into the holder 28 from the front side, and the front surface of the peripheral edge portion 47 of the image forming lens 46 is pushed by the rear surface of the fixing member 44. Note that, at this time, the rear surface of the fixing member 44 abuts the first step portion 28B, and, in this state, the fixing member 44 is joined to the inner peripheral surface of the holder 28 by an adhesive or the like.

Due to the above, the image forming lenses 46, 48 are provided in a state of being fixed to the holder 28 interior. Further, after the image forming lenses 46, 48 are provided within the holder 28, the image forming lens 36 that is at the frontmost side is, as described above, joined to the seating surface 28A of the holder 28 by laser welding.

When the projecting lens 34 is structured in this way by the image forming lenses 36, 46, 48, 38 that have respectively different refractive indices, light can be illuminated toward the pedestrian P more clearly (color aberration is corrected, and color separation at the light/dark borders of the light distribution pattern is suppressed), as compared with a case in which the projecting lens 34 is structured by a single lens.

Accordingly, a decrease in the contrast at the edge portions of the region onto which the light is illuminated can be suppressed more effectively, and it is even easier for the driver of the vehicle 12 to recognize the pedestrian P that there is the concern that the vehicle 12 will collide with. Note that, because the image forming lens 36 at the frontmost side and the image forming lens 38 at the rearmost side are respectively joined to the holder 28 by laser welding, the positional accuracy of at least the image forming lens 36 at the frontmost side and the image forming lens 38 at the rearmost side can be improved.

Figure 13A:
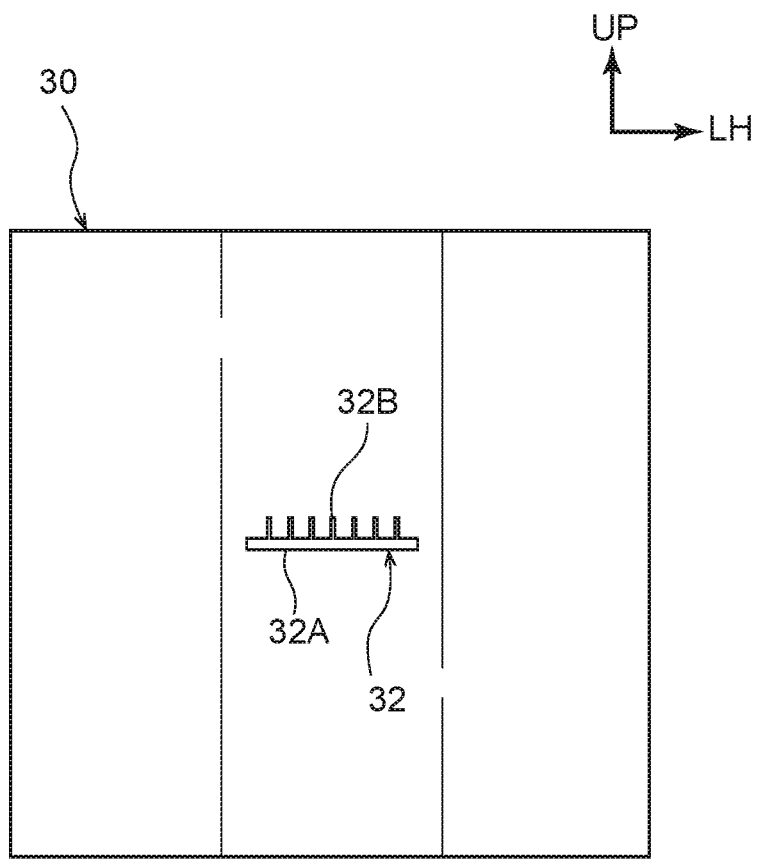
FIG. 13A is a front view showing the light-blocking member of the illumination device for a vehicle relating to the fourth embodiment.
Figure 13B:
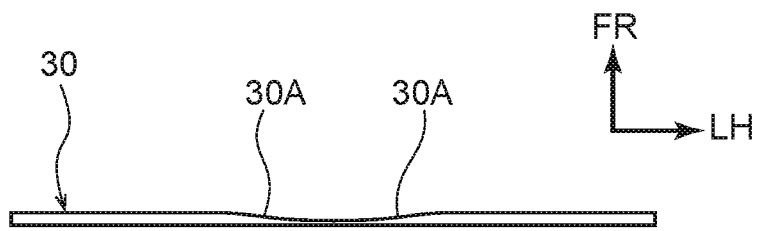
FIG. 13B is a bottom view showing the light-blocking member of the illumination device for a vehicle in the fourth embodiment.

Further, the light-blocking member 30 is made to be the light-blocking member 30 that is similar to that of the third embodiment and at which the opening portion 32 is formed in the shape of a comb. However, as shown in FIG. 13A and FIG. 13B, the light-blocking member 30 in this fourth embodiment may be formed such that the plate thickness of the vehicle transverse direction central portion thereof becomes gradually thinner than the plate thickness at the vehicle transverse direction both end portion sides.

Namely, as seen in a bottom view (as seen in a plan view), inclined surfaces 30A, which are inclined downward from the vehicle transverse direction both end portion sides toward the vehicle transverse direction central portion, are formed at the light-blocking member 30. Note that, because the opening portion 32 of the light-blocking member 30 is formed at the vehicle transverse direction central portion of the light-blocking member 30, the plate thickness at this opening portion 32 as well is formed to be thinner at the vehicle transverse direction central portion than at the vehicle transverse direction both end portion sides.

Figure 14A:
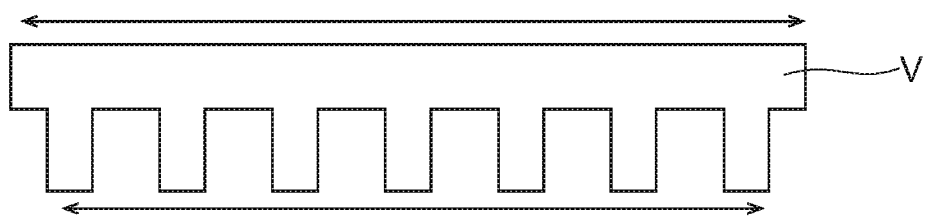
FIG. 14A is an explanatory drawing that schematically shows light that has passed through the light-blocking member relating to the fourth embodiment and has been illuminated.
Figure 14B:
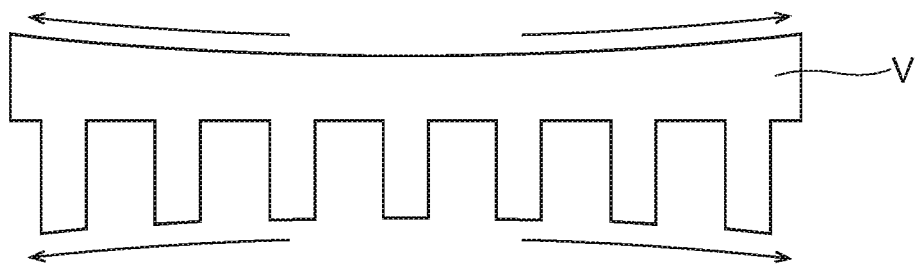
FIG. 14B is an explanatory view that schematically shows light that has passed through a light-blocking member relating to a comparative example and has been illuminated.

Here, if the light-blocking member 30 is made to be a constant plate thickness in the vehicle transverse direction, as shown in FIG. 14B, warping (elongation) that is directed upward and downward arises at the illumination light V at the vehicle transverse direction both end portion sides.

In contrast, if there is a structure in which the plate thickness of the vehicle transverse direction central portion of the light-blocking member 30 becomes gradually thinner than the plate thickness of the vehicle transverse direction both end portion sides (i.e., a structure in which the inclined surfaces 30A are formed), as shown in FIG. 14A, warping (elongation) that is directed upward and downward is reduced at the illumination light V at the vehicle transverse direction both end portion sides.

Accordingly, a decrease in the contrast at the edge portions of the region onto which the light is illuminated (in particular, the regions at the vehicle transverse direction both end portions sides) can be suppressed more so than in the first embodiment that shown in FIG. 5, the second embodiment that is shown in FIG. 7, and the third embodiment that is shown in FIG. 9. Accordingly, as compared with the first embodiment, the second embodiment and the third embodiment, the ability of the driver to see the pedestrian P that there is the concern that the vehicle 12 will collide with can be improved more.

Note that the light illuminated from the light sources 20 is diffused in the vertical direction by the optical lenses 40. Therefore, as shown in FIG. 15A and FIG. 15B (the optical lenses 40 are omitted in FIG. 15A and FIG. 15B), even though there is the opening portion 32 whose vertical direction dimension is larger than that of the light sources 20 that are lined-up in only one line, light is illuminated by these light sources 20 from the entire vertical direction of the opening portion 32.

Figure 15B:
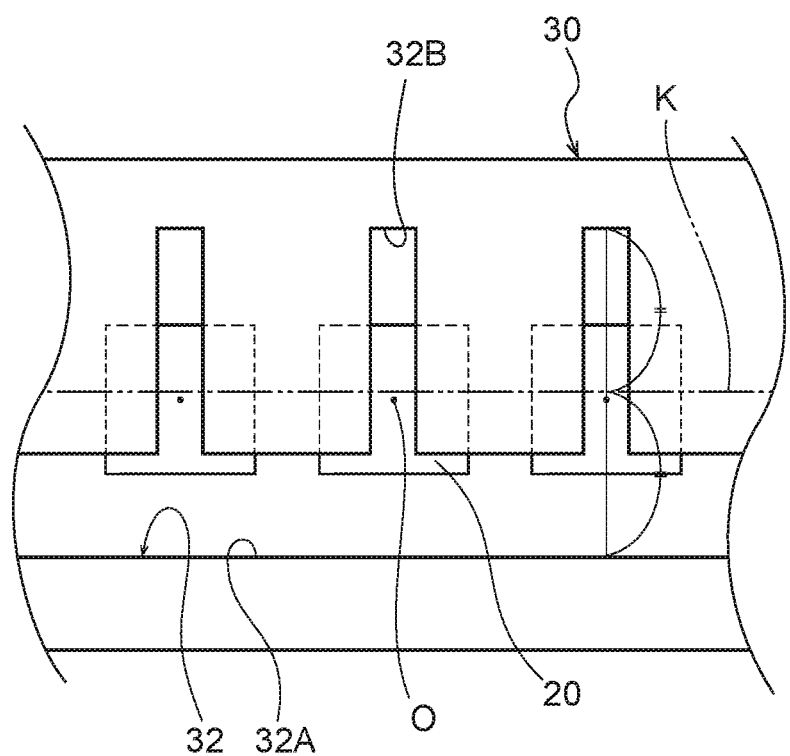
FIG. 15B is a front view showing the positional relationship between an opening portion of a light-blocking member and light sources relating to a comparative example.

Further, as shown in FIG. 15A, the respective light sources 20 are disposed so as to be at the vertical direction lower side with respect to the opening portion 32 of the light-blocking member 30. In detail, in the comparative example shown in FIG. 15B, the light-blocking member 30 is disposed with respect to the light sources 20 such that centers O of the respective light sources 20 are positioned in a vicinity of the vertical direction central portion (imaginary central line K) of the opening portion 32.

In this case, at the light (visible light) that is illuminated from the light sources 20 and is transmitted through the optical lenses 40 and is diffused upward, downward, leftward and rightward, the regions that are blocked by the light-blocking member 30 are larger (the amount of the light that is illuminated is reduced). Therefore, it is difficult for the light, which passes through the image forming lenses 38, 48, 46, 36 (the projecting lens 34) in that order from the rear and is illuminated (projected) forward, to become uniform, particularly in the vertical direction.

In contrast, in the present embodiment, as shown in FIG. 15A, the light-blocking member 30 is disposed with respect to the light sources 20 such that the centers O of the respective light sources 20 are positioned further toward the lower side than the vertical direction central portion (the imaginary central line K) of the opening portion 32 (i.e., such that the centers O face the lower portion opening 32A in the optical axis direction).

Accordingly, at the light (visible light) that is illuminated from the light sources 20 and passes through the optical lenses 40 and is diffused upward, downward, leftward and rightward, the regions that are blocked by the light-blocking member 30 are smaller (a decrease in the amount of the light that is illuminated is suppressed), and the light, which passes through the image forming lenses 38, 48, 46, 36 (the projecting lens 34) in that order from the rear and is illuminated (projected) forward, becomes uniform, particularly in the vertical direction.

Accordingly, a decrease in the contrast at the edge portions (in particular, the upper edge portion and the lower edge portion) of the region onto which the light is illuminated can be suppressed, and the ability of the driver to see the pedestrian P that there is the concern that the vehicle 12 will collide with can be improved more. Further, because the light that is illuminated from the light sources 20 is diffused also in the left-right direction by the optical lenses 40, even if the respective light sources 20 are disposed with gaps therebetween, it is difficult for the dark regions D to be formed in the illumination light V that is illuminated toward the front side of the vehicle 12.

The illumination devices 10 for a vehicle relating to the present embodiments have been described above on the basis of the drawings. However, the illumination devices 10 for a vehicle relating to the present embodiments are not illuminated to the illustrated structures, and the designs thereof can be changed appropriately within a scope that does not depart from the gist of the present disclosure. For example, in the illumination devices 10 for a vehicle relating to the present embodiments, the low beam unit 16 and the high beam unit 18 may be made integral.

Further, in the fourth embodiment, it suffices for the projecting lens 34 to be structured by plural image forming lenses, and the projecting lens 34 is not limited to a form of being structured by the four image forming lenses 36, 46, 48, 38 that are illustrated. Moreover, the shapes of the image forming lenses 36, 46, 48, 38 that structure the projecting lens 34 also respectively are not limited to the illustrated shapes. Further, in the first embodiment, it suffices for the light sources 20 to be disposed in at least one line in the vehicle transverse direction, and the light sources 20 are not limited to a structure of being disposed in two lines such as shown in FIG. 3.

What is claimed is:

1. An illumination device for a vehicle, comprising:
   a plurality of light sources that are disposed so as to be lined-up in at least one line, and that illuminate light;
   a light-blocking member having an opening portion onto which light illuminated from the light sources is incident; and
   a projecting lens that emits, toward an object, light that has passed through the opening portion of the light-blocking member and has been incident on the projecting lens,
   wherein a central portion of the light-blocking member which is centrally located in a line direction in which the plurality of light sources are lined-up is formed to be thinner than both end portion sides of the light-blocking member.

2. The illumination device for a vehicle of claim 1, further comprising:
   recognizing unit for recognizing the object; and
   control unit for lighting, among the plurality of light sources, only the light sources corresponding to a position of the object recognized by the recognizing unit.

3. The illumination device for a vehicle of claim 1, wherein
   the plurality of light sources are disposed so as to be lined-up in a vehicle transverse direction, and
   the opening portion of the light-blocking member is formed in a shape of a comb in which a lower portion opening whose length direction is the vehicle transverse direction, and a plurality of upper portions openings that project-out from the lower portion opening in a vehicle upward direction, respectively face the plurality of light sources.

4. The illumination device for a vehicle of claim 2, wherein
   the plurality of light sources are disposed so as to be lined-up in a vehicle transverse direction, and
   the opening portion of the light-blocking member is formed in a shape of a comb in which a lower portion opening whose length direction is the vehicle transverse direction, and a plurality of upper portions openings that project-out from the lower portion opening in a vehicle upward direction, respectively face the plurality of light sources.

5. The illumination device for a vehicle of claim 1, wherein
   the plurality of light sources are disposed so as to be lined-up in a vehicle transverse direction, and the opening portion of the light-blocking member is formed in upside-down T-shapes that face the plurality of light sources respectively.

6. The illumination device for a vehicle of claim 2, wherein
the plurality of light sources are disposed so as to be lined-up in a vehicle transverse direction, and
the opening portion of the light-blocking member is formed in upside-down T-shapes that face the plurality of light sources respectively.

7. The illumination device for a vehicle of claim 3, wherein the plurality of light sources are made to be in only one line and are disposed such that centers of the light sources are positioned further toward a lower side than a vehicle vertical direction central portion of the opening portion of the light-blocking member.

8. The illumination device for a vehicle of claim 5, wherein the plurality of light sources are made to be in only one line and are disposed such that centers of the light sources are positioned further toward a lower side than a vehicle vertical direction central portion of the opening portion of the light-blocking member.

9. The illumination device for a vehicle of claim 1, wherein the plurality of light sources are disposed so as to be lined-up in two or more lines.

10. The illumination device for a vehicle of claim 2, wherein the plurality of light sources are disposed so as to be lined-up in two or more lines.

11. The illumination device for a vehicle of claim 1, wherein the projecting lens is structured by a plurality of image forming lenses.

12. The illumination device for a vehicle of claim 2, wherein the projecting lens is structured by a plurality of image forming lenses.

\* \* \* \* \*